United States Patent
Lo et al.

(10) Patent No.: US 11,558,304 B2
(45) Date of Patent: *Jan. 17, 2023

(54) NETWORK FLOW SAMPLING FAIRNESS

(71) Applicant: MELLANOX TECHNOLOGIES, LTD., Yokneam (IL)

(72) Inventors: Alan Lo, Boulder, CO (US); Matty Kadosh, Hadera (IL); Marian Pritsak, Lviv (UA); Yonatan Piasetsky, Tel Aviv (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/687,642

(22) Filed: Mar. 6, 2022

(65) Prior Publication Data

US 2022/0255870 A1  Aug. 11, 2022

Related U.S. Application Data

(63) Continuation of application No. 17/172,166, filed on Feb. 10, 2021, now Pat. No. 11,310,163.

(51) Int. Cl.
*H04L 47/2483* (2022.01)
*H04L 47/2441* (2022.01)
(Continued)

(52) U.S. Cl.
CPC ...... *H04L 47/2483* (2013.01); *H04L 43/0811* (2013.01); *H04L 43/16* (2013.01); *H04L 47/20* (2013.01); *H04L 47/2441* (2013.01)

(58) Field of Classification Search
CPC . H04L 47/2483; H04L 43/0811; H04L 43/16; H04L 47/2441; H04L 47/20
See application file for complete search history.

(56) References Cited

U.S. PATENT DOCUMENTS 6,751,663 B1   6/2004  Farrell et al.
7,787,472 B2   8/2010  Washburn et al.
(Continued)

FOREIGN PATENT DOCUMENTS

WO   2020212308 A1   10/2020

OTHER PUBLICATIONS

Heinanen et al., "A Single Rate Three Color Marker," Request for Comments (RFC) 2697, The Internet Society, pp. 1-7, Sep. 1999.
(Continued)

*Primary Examiner* — Cheikh T Ndiaye
(74) *Attorney, Agent, or Firm* — Kligler & Associates Patent Attorneys Ltd (57) ABSTRACT

In one embodiment, a network flow sampling system includes packet processing circuitry to process data packets of multiple network flows, and an adaptive policer to, for each one network flow of the multiple network flows compute a quantity of flow-specific sampling credits to be assigned to the one network flow responsively to a quantity of the network flows currently being processed by the packet processing circuitry, assign the flow-specific sampling credits to the one network flow, sample at least one of the data packets of the one network flow responsively to availability of the flow-specific sampling credits of the one network flow yielding sampled data, while applying sampling fairness among the network flows, and remove at least one of the flow-specific sampling credits of the one network flow from availability responsively to sampling the at least one data packet of the one network flow.

20 Claims, 4 Drawing Sheets

(51) Int. Cl.
*H04L 43/0811* (2022.01)
*H04L 43/16* (2022.01)
*H04L 47/20* (2022.01)

(56) References Cited

U.S. PATENT DOCUMENTS

| | | | |
|---|---|---|---|
| 8,045,470 B2* | 10/2011 | Zseby | H04L 41/142 |
| | | | 709/224 |
| 8,705,365 B1* | 4/2014 | Martin | H04L 47/2441 |
| | | | 370/235 |
| 8,856,518 B2 | 10/2014 | Sridharan et al. | |
| 9,331,947 B1 | 5/2016 | O'Keeffe et al. | |
| 9,450,881 B2 | 9/2016 | Dumitrescu et al. | |
| 9,942,158 B2 | 4/2018 | Shetty et al. | |
| 10,181,987 B2 | 1/2019 | Grandham et al. | |
| 10,237,354 B2 | 3/2019 | Jani | |
| 10,341,263 B2 | 7/2019 | Zou et al. | |
| 10,432,745 B2 | 10/2019 | Daly et al. | |
| 10,924,418 B1* | 2/2021 | Gudibanda | H04L 43/024 |
| 11,310,163 B1 | 4/2022 | Lo et al. | |
| 2004/0081095 A1 | 4/2004 | Liu et al. | |
| 2005/0160180 A1 | 7/2005 | Rabje et al. | |
| 2006/0221819 A1 | 10/2006 | Padwekar | |
| 2009/0109847 A1 | 4/2009 | Stephenson et al. | |
| 2010/0150004 A1* | 6/2010 | Duffield | H04L 41/12 |
| | | | 370/252 |
| 2011/0080886 A1 | 4/2011 | Chandrachood et al. | |
| 2012/0054363 A1 | 3/2012 | Hart | |
| 2015/0006755 A1 | 1/2015 | Turlington et al. | |
| 2015/0085694 A1* | 3/2015 | Agarwal | H04L 41/40 |
| | | | 370/253 |
| 2016/0262073 A1 | 9/2016 | Muley et al. | |
| 2017/0177222 A1 | 6/2017 | Singh et al. | |
| 2019/0058641 A1* | 2/2019 | Mirzazad Barijough | H04L 43/026 |
| 2020/0358674 A1* | 11/2020 | Harikrishnan | H04L 43/026 |
| 2021/0084530 A1* | 3/2021 | Song | H04L 43/024 |
| 2021/0117360 A1 | 4/2021 | Kutch et al. | |

OTHER PUBLICATIONS

Heinanen et al., "A Two Rate Three Color Marker," Request for Comments (RFC) 2698, The Internet Society, pp. 1-6, Sep. 1999.
Hahne et al., "Dynamic Queue Length Thresholds for Multiple Loss Priorities," IEEE/ACM Transactions on Networking, vol. 10, No. 3, pp. 368-380, Jun. 2002.
Claise et al., "Specification of the IP Flow Information Export (IPFIX) Protocol for the Exchange of Flow Information," Request for Comments (RFC) 7011, Internet Engineering Task Force (IETF), pp. 1-77, Sep. 2013.
Urman et al., U.S. Appl. No. 17/151,705, filed Jan. 19, 2021.

* cited by examiner

NETWORK FLOW SAMPLING FAIRNESS

RELATED APPLICATION INFORMATION

The present application is a Continuation Application of U.S. patent application Ser. No. 17/172,166 of Lo, et al., filed 10 Feb. 2021, the disclosure of which is hereby incorporated herein by reference.

FIELD OF THE INVENTION

The present invention relates to computer systems, and in particular, but not exclusively to, packet sampling.

BACKGROUND

Telemetry in networking provides the ability to monitor and retrieve information from a network, for example, from one or more given network devices. The telemetry information that may be retrieved from a network device like a switch, router, or network interface card (NIC) may vary and depend, for example, on the type of the network device and the vendor. There are several categories of telemetry information, such as status-based and event-driven telemetry information.

Collecting telemetry information is described in several publications. For example, U.S. Pat. No. 6,751,663 to Farrell, et al., describes a system for collecting and aggregating data from network entities for a data consuming application is described. The system includes a data collector layer to receive network flow information from the network entities and to produce records based on the information. The system also includes a flow aggregation layer fed from the data collection layer and coupled to a storage device. The flow aggregation layer receiving records produced by the data collector layer and aggregates received records. The system can also include an equipment interface layer coupled to the data collector layer and a distribution layer to obtain selected information stored in the storage device and to distribute the select information to a requesting, data consuming application.

By way of another example, U.S. Pat. No. 10,181,987 to Grandham, et al., describes systems, methods, and computer-readable media for collector high availability. In some embodiments, a system receives, from a first collector device, a first data report generated by a capturing agent deployed on a host system in a network. The system can also receive, from a second collector device, a second data report generated by the capturing agent deployed on the host system. The first and second data reports can include traffic data captured at the host system by the capturing agent during a period of time. The system can determine that the first data report and the second data report are both associated with the capturing agent, and identify duplicate data contained in the first data report and the second data report. The system can then deduplicate the first and second data reports to yield a deduplicated data report.

SUMMARY

There is provided in accordance with an embodiment of the present disclosure, a network flow sampling system including data communication apparatus, which includes packet processing circuitry configured to process data packets of multiple network flows, and an adaptive policer configured to sample respective ones of the data packets of respective ones of the network flows yielding sampled data, while applying sampling fairness among the respective network flows, wherein at least one of the data packets from each of the respective network flows is sampled.

Further in accordance with an embodiment of the present disclosure the adaptive policer is configured to sample respective ones of the data packets of each of the network flows being processed by the packet processing circuitry while applying sampling fairness among the network flows.

Still further in accordance with an embodiment of the present disclosure the adaptive policer is configured to assign flow-specific sampling credits to each of the respective network flows, sample the respective ones of the data packets responsively to availability of respective ones of the flow-specific sampling credits of the respective network flows, and remove the respective ones of the flow-specific sampling credits from availability responsively to sampling the respective ones of the data packets of the respective network flows.

Additionally, in accordance with an embodiment of the present disclosure the adaptive policer is configured to assign additional flow-specific sampling credits to each of the respective network flows intermittently.

Moreover, in accordance with an embodiment of the present disclosure the adaptive policer is configured to assign additional flow-specific sampling credits to each of the respective network flows responsively to a minimum flow-specific sampling credit threshold.

Further in accordance with an embodiment of the present disclosure the adaptive policer is configured to compute a respective quantity of the additional flow-specific sampling credits to be assigned to each of the respective network flows responsively to a quantity of the respective network flows currently being processed by the packet processing circuitry.

Still further in accordance with an embodiment of the present disclosure the adaptive policer is configured to compute the respective quantity of the additional flow-specific sampling credits to be assigned to each of the respective network flows responsively to a function which has an output which is inversely proportional to the quantity of the respective network flows currently being processed by the packet processing circuitry.

Additionally, in accordance with an embodiment of the present disclosure the adaptive policer is configured to compute the respective quantity of the additional flow-specific sampling credits to be assigned to each of the respective network flows responsively to a reserved sampling capacity, which avoids oversubscribing of the adaptive policer.

Moreover, in accordance with an embodiment of the present disclosure the adaptive policer is configured to compute the reserved sampling capacity of the adaptive policer responsively to the quantity of the respective network flows currently being processed by the packet processing circuitry.

Further in accordance with an embodiment of the present disclosure the adaptive policer is configured to forward the sampled data to a data analyzer.

Still further in accordance with an embodiment of the present disclosure, the system includes the data analyzer, which is configured to perform any one or more of the following responsively to the sampled data provide information about network performance, identify network bottlenecks, identify lost packets, identify lost flows, perform general debugging, perform end-to-end debugging, or provide information for the purposes of network optimization and future planning.

There is also provided in accordance with another embodiment of the present disclosure, a network flow sampling method, including processing data packets of multiple network flows, and sampling respective ones of the data packets of respective ones of the network flows yielding sampled data, while applying sampling fairness among the respective network flows, wherein at least one of the data packets from each of the respective network flows is sampled.

Additionally in accordance with an embodiment of the present disclosure, the method includes assigning flow-specific sampling credits to each of the respective network flows, wherein the sampling includes sampling the respective ones of the data packets responsively to availability of respective ones of the flow-specific sampling credits of the respective network flows, and removing the respective ones of the flow-specific sampling credits from availability, responsively to sampling the respective ones of the data packets of the respective network flows.

Moreover, in accordance with an embodiment of the present disclosure, the method includes assigning additional flow-specific sampling credits to each of the respective network flows intermittently.

Further in accordance with an embodiment of the present disclosure the assigning the additional flow-specific sampling credits to each of the respective network flows is performed responsively to a minimum flow-specific sampling credit threshold.

Still further in accordance with an embodiment of the present disclosure, the method includes computing a respective quantity of the additional flow-specific sampling credits to be assigned to each of the respective network flows responsively to a quantity of the respective network flows currently being processed by packet processing circuitry.

Additionally, in accordance with an embodiment of the present disclosure the computing includes computing the respective quantity of the additional flow-specific sampling credits to be assigned to each of the respective network flows responsively to a function which has an output which is inversely proportional to the quantity of the respective network flows currently being processed by the packet processing circuitry.

Moreover, in accordance with an embodiment of the present disclosure the computing includes computing the respective quantity of the additional flow-specific sampling credits to be assigned to each of the respective network flows responsively to a reserved sampling capacity, which avoids oversubscribing.

Further in accordance with an embodiment of the present disclosure the computing includes computing the reserved sampling capacity responsively to the quantity of the respective network flows currently being processed by the packet processing circuitry.

Still further in accordance with an embodiment of the present disclosure, the method includes forwarding the sampled data to a data analyzer.

Additionally, in accordance with an embodiment of the present disclosure, the method includes performing any one or more of the following responsively to the sampled data providing information about network performance, identifying network bottlenecks, identifying lost packets, identifying lost flows, performing general debugging, performing end-to-end debugging, or providing information for the purposes of network optimization and future planning.

There is also provided in accordance with still another embodiment of the present disclosure, a software product, including a non-transient computer-readable medium in which program instructions are stored, which instructions, when read by a central processing unit (CPU), cause the CPU to sample respective data packets of respective network flows yielding sampled data, while applying sampling fairness among the respective network flows, wherein at least one of the data packets from each of the respective network flows is sampled.

BRIEF DESCRIPTION OF THE DRAWINGS

The present invention will be understood from the following detailed description, taken in conjunction with the drawings in which.

DESCRIPTION OF EXAMPLE EMBODIMENTS

Overview

Packets from different network flows may be sampled in data communication devices to identify problems as well as improve processing of packets in the data communication devices, by way of example. Starvation and unfairness among the network flows may arise where the different flows are destined to the same policer, which is performing packet sampling. For example, packets of high bandwidth flows (e.g., elephant flows) may use all of the policer's available sampling bandwidth, while starving out the other lower bandwidth flows (e.g., mouse flows). Therefore, the sampling provides a false indication that the flows mainly consist of elephant flows and none or very few mouse flows, when in fact the mouse flows may be more representative of the overall picture of the flows.

Embodiments of the present invention solve the above problems by providing data communication apparatus (e.g., a switch, router, or network interface controller (NIC)), which includes an adaptive policer, which samples data packets of respective network flows (e.g., of each network flow being processed by the data communication apparatus) yielding sampled data, while applying sampling fairness among the respective network flows (e.g., among all of the network flows). In this manner, at least one data packet from each respective network flow is sampled (e.g., at least one data packet is sampled from each network flow). For example, the adaptive policer may sample a given number of packets per flow so that it would sample for example one out of every 100 packets per flow or the sampling may be statistical so that on average the adaptive policer samples one out of every 100 packets per flow.

A "network flow" as used in the specification and claims is defined as a connection over a network between two endpoints, and is typically identified by any suitable packet field or fields which define a session or connection, such as the IP and TCP/UDP 5-tuple of source and destination addresses, source and destination ports, and protocol, which are consistent over all of the packets in the flow, or MPLS or other packet fields.

The sampled data may be forwarded to a data analyzer which perform any one or more of the following responsively to the sampled data: provides information about network performance; identifies network bottlenecks; identifies lost packets; identifies lost flows; performs general debugging; performs end-to-end debugging; or provides information for the purposes of network optimization and future planning.

The adaptive policer may provide sampling fairness among the network flows by running a credit scheme in which credits are intermittently allocated to each of the flows currently being processed by the data communication device. The adaptive policer then samples the packets of the respective network flows according to the credits currently available for each respective network flow. Credits for each flow are consumed (i.e., become unavailable) as packets for that flow are sampled. For example, if a flow has 4 credits, the first 4 packets of that flow will be sampled and once the available credits for that flow are used, no more packets will be sampled from that flow until that flow is assigned more credits.

In some embodiments, the adaptive policer computes a respective quantity of flow-specific sampling credits to be assigned to each of the respective network flows responsively to a quantity of the respective network flows currently being processed by the data communication device. The number of credits may be the same per flow or different for different flows. For example, higher priority flows may receive more credits. In some embodiments, the adaptive policer computes the respective quantity of flow-specific sampling credits to be assigned to each respective network flow responsively to a function which has an output which is inversely proportional to the quantity of the respective network flows currently being processed by the data communication device.

For example, if the adaptive policer can sample 100 packets in a given time period, and there are 20 active flows at time t1, then 5 credits are assigned to each active flow after time t1. If the number of active flows decreases to 10 at time t2, then 10 credits are assigned to each active flow after time t2.

In some embodiments, to prevent oversubscription of the adaptive policer some sampling capacity of the adaptive policer may be reserved. For example, if the adaptive policer can sample 100 packets in a given time period, then 90 credits may be allocated among the flows while 10 credits are reserved (i.e., not assigned). In some embodiments, the reserved capacity may be inversely proportional to the number of active flows. For example, if there are 2 flows, the reserved capacity may correspond to 30 credits and if there are 10 flows, the reserved capacity may correspond to 5 credits. The reserved capacity may be computed based on any suitable algorithm, for example, a dynamic threshold scheme. For example, the reserved sampling capacity may be computed based on an algorithm, which is used to reserve buffer space according to the number of output queues as described in Hahne (Ellen Hahne. IEEE/ACM Transactions on Networking, Vol 10, No. 3, June 2002). The algorithm of Hahne may be applied to compute the reserved sampling capacity but instead of computing the reserved capacity based on the number of output queues as described in Hahne, the reserved capacity is computed based on the number of active network flows.

System Description

Figure 1:
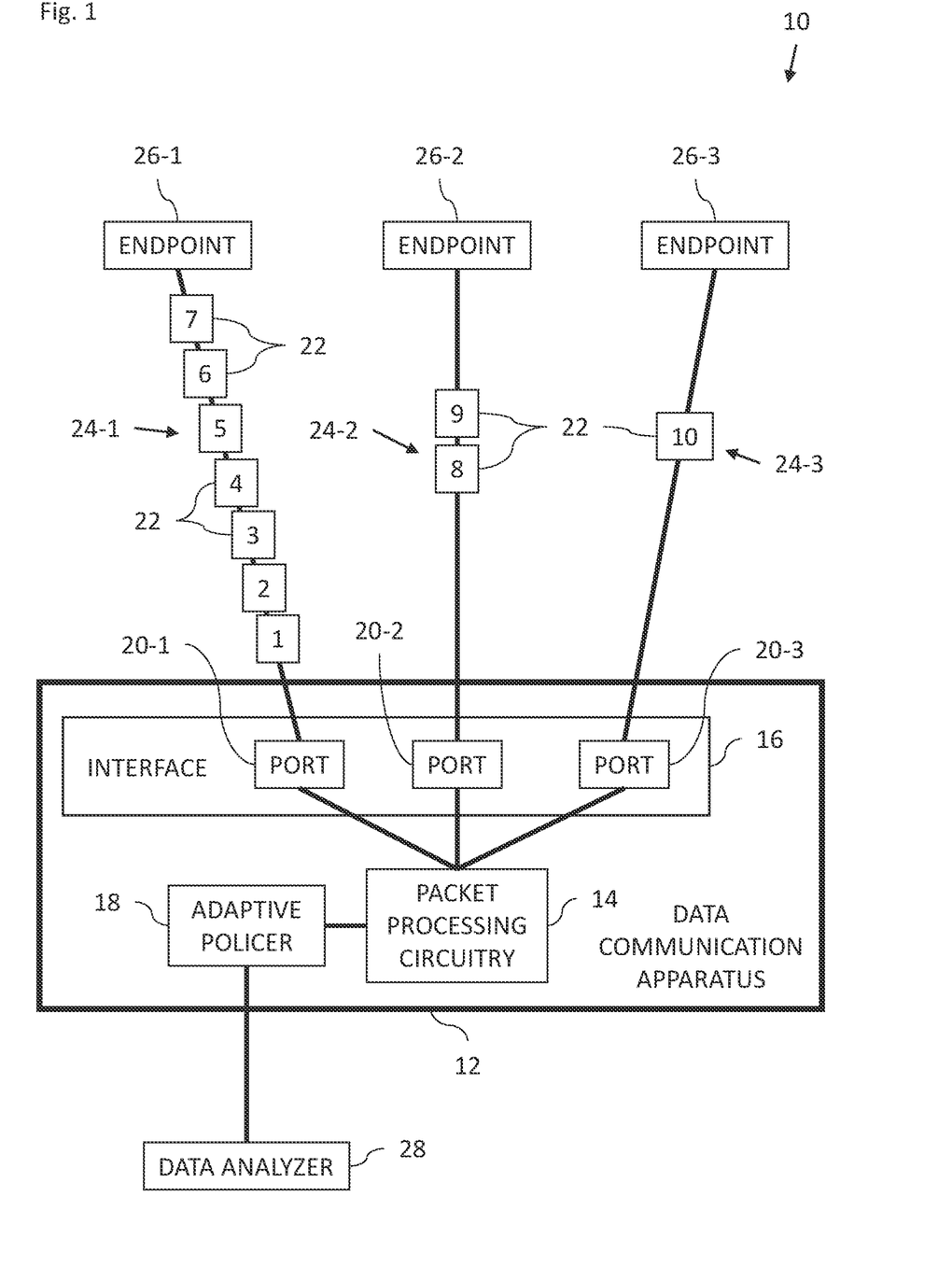
FIG. 1 is a block diagram view of a network flow sampling system constructed and operative in accordance with an embodiment of the present invention.

Reference is now made to FIG. 1, which is a block diagram view of a network flow sampling system 10 constructed and operative in accordance with an embodiment of the present invention.

The network flow sampling system 10 includes data communication apparatus 12, which includes packet processing circuitry 14, an interface 16, and an adaptive policer 18. The data communication apparatus 12 may be implemented as any suitable data communication apparatus, for example, a switch, router, or NIC. The data communication apparatus 12 may include other elements not shown in FIG. 1 or described herein, which have been omitted for the sake of simplicity.

The interface 16 shown in FIG. 1 includes three ports 20 (labeled 20-1, 20-2, and 20-3). The interface 16 may include any suitable number of ports, for example, one or more ports. In FIG. 1, port 20-1 is shown as receiving packets 22 of a network flow 24-1 from an endpoint 26-1, port 20-2 is shown as receiving packets 22 of a network flow 24-2 from an endpoint 26-2, and port 20-3 is shown as receiving packets 22 of a network flow 24-3 from an endpoint 26-3. Only some of the packets 22 have been labeled in FIG. 1 for the sake of simplicity. The packet processing circuitry 14 is configured to process data packets 22 of the multiple network flows 24.

The network flow 24-1 shown in FIG. 1 may be considered an elephant flow compared to the network flows 24-2 and 24-3. Therefore, if the adaptive policer 18 were to sample the packets 22 of the network flows 24 without applying fairness, the sampled packets 22 would likely be mainly (or only) from the elephant network flow 24-1 thereby presenting a distorted picture of the activity of the data communication apparatus 12. Therefore, the adaptive policer 18 is configured to sample respective ones of the data packets 22 of respective ones of the network flows 24 yielding sampled data, while applying sampling fairness among the respective network flows 24, wherein at least one data packet 22 from each respective network flow 24 is sampled in a sampling time period. The adaptive policer 18 and how it provides sampling fairness is described in more detail with reference to FIGS. 2-5.

In practice, some or all of the functions of the adaptive policer 18 may be combined in a single physical component or, alternatively, implemented using multiple physical components. These physical components may comprise hardwired or programmable devices, or a combination of the two. For example, a stateful application-specific integrated circuit (ASIC) with a flow table may perform the functions of the adaptive policer 18. In some embodiments, at least some of the functions of the adaptive policer 18 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

The network flow sampling system 10 also comprises a data analyzer 28 (e.g., a telemetry collector). The adaptive policer 28 is configured to forward the sampled data to the data analyzer 28. The data analyzer 28 is configured to perform any one or more of the following responsively to the sampled data: provide information about network performance; identify network bottlenecks; identify lost packets; identify lost flows; perform general debugging; perform end-to-end debugging; provide information for the purposes of network optimization and future planning; or any other data analysis based on the sampled data.

Figure 2:
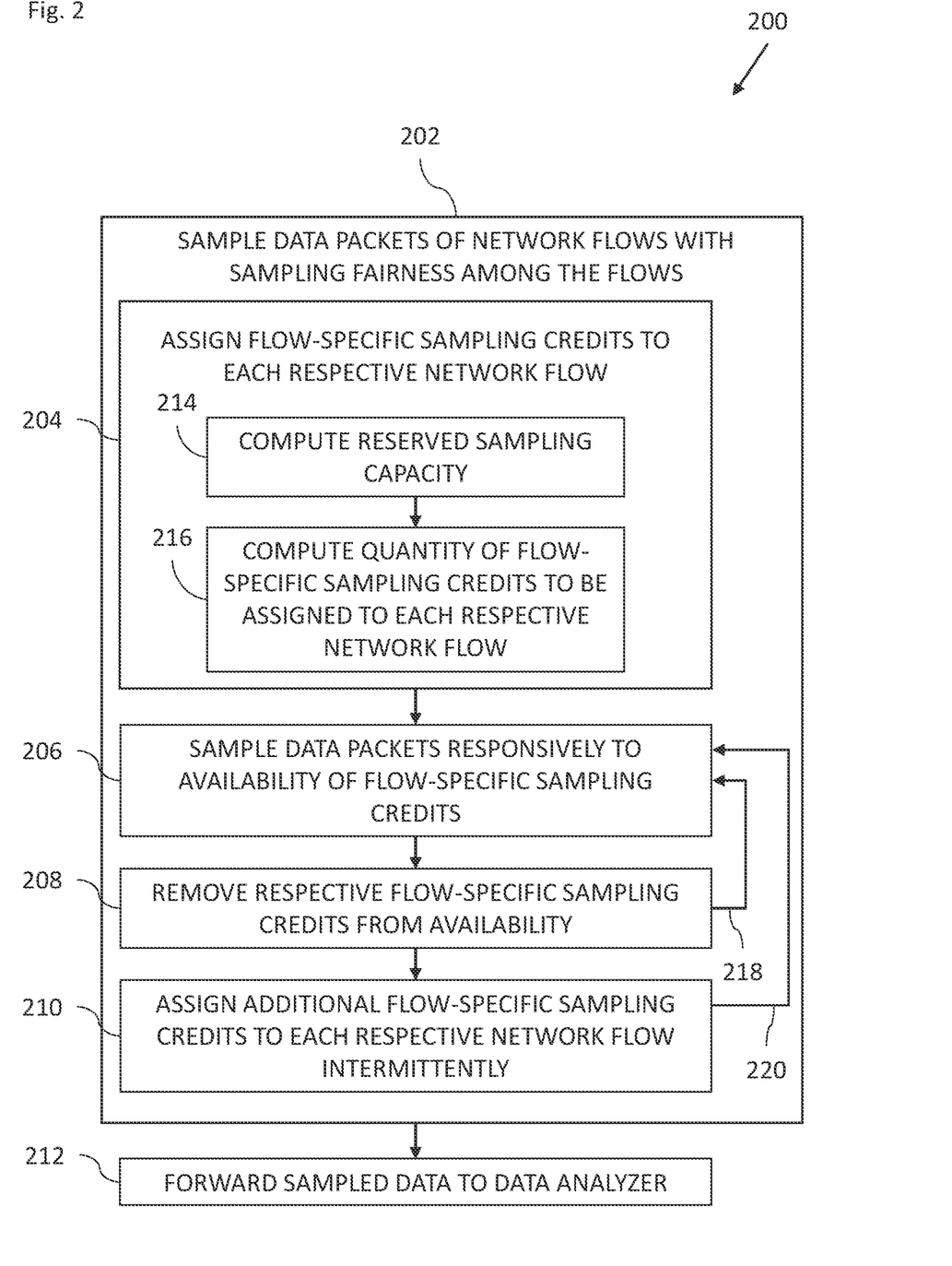
FIG. 2 is a flowchart including steps in a method of sampling with fairness in the system of FIG. 1.

Reference is now made to FIG. 2, which is a flowchart 200 including steps in a method of sampling with fairness in the system 10 of FIG. 1. Reference is also made to FIG. 1.

The adaptive policer 18 is configured to sample (block 202) respective ones of the data packets 22 of respective ones of the network flows 24 yielding sampled data, while applying sampling fairness among the respective network flows 24, wherein at least one of the data packets 22 from each of the respective network flows 24 is sampled. In some embodiments, the adaptive policer 18 is configured to sample respective ones of the data packets 22 of each of the network flows 24 being processed by the packet processing circuitry 14 while applying sampling fairness among the network flows 24.

Sub-steps of the step of block 202 are now described with reference to blocks 204-210.

The adaptive policer 18 is configured to assign (block 204) flow-specific sampling credits to each of the respective network flows 24. The flow-specific sampling credits are assigned to the network flows 24 intermittently. For example, when the credits of all the network flows 24 are below a minimum credit threshold, the adaptive policer 18 reassigns flow-specific sampling credits to all the active network flows 24.

The adaptive policer 18 is configured to sample (block 206) the respective data packets 22 responsively to availability of respective ones of the flow-specific sampling credits of the respective network flows 24. In other words, the adaptive policer 18 samples the packets 22 of the respective network flows 24 according to the credits currently available for each respective network flow 24. Credits are consumed (i.e., become unavailable) as packets are sampled corresponding to the available credits, as described in more detail below. For example, if a network flow has 4 credits, the first 4 packets of that network flow 24 will be sampled, and once the available credits for that network flow 24 are used, no more packets will be sampled from that network flow 24 until that network flow 24 is assigned more credits. The adaptive policer 18 is configured to remove (block 208) respective flow-specific sampling credits from availability responsively to sampling respective data packets 22 of respective network flows 24. For example, if a network flow 24 has 4 credits, and one packet 22 is sampled for that network flow 24, the available number of credits for that network flow 24 is reduced by 1 to 3 credits. The steps of blocks 206 and 208 are repeated (arrow 218) as sampling is performed.

The adaptive policer 18 is configured to assign (block 210) additional flow-specific sampling credits to each of the active network flows 24 intermittently. For example, if new flows are now being processed, the new flows will now receive sampling credits and network flows which are no longer being processed by the data communication apparatus 12 will no longer receiver sampling credits. The sub-step of block 210 is performed in a similar manner to the sub-step of block 204 which also includes sub-steps of blocks 214-216 described in more detail below. The sub-steps of blocks 206-208 are repeated (arrow 220) performing sampling based on the additionally assigned flow-specific sampling credits.

The adaptive policer 18 is configured to forward (block 212) the sampled data to the data analyzer 28 as the data is sampled or intermittently in batches.

The adaptive policer 18 is configured to compute (block 216) a respective quantity of flow-specific sampling credits to be assigned to each of the respective network flows 24 responsively to a quantity of the respective network flows 24 currently being processed by the packet processing circuitry 14. The number of credits may be the same per flow 24 or different for different flows 24. For example, higher priority flows 24 may receive more credits than lower priority network flows. In some embodiments, the adaptive policer 18 is configured to compute the respective quantity of the flow-specific sampling credits to be assigned to each of the respective network flows 24 responsively to a function which has an output which is inversely proportional to the quantity of the respective network flows 24 currently being processed by the packet processing circuitry 14. For example, if the adaptive policer 18 can sample 100 packets 22 in a given time period, and there are 20 active network flows at time ii, then 5 credits are assigned to each active network flow after time t1. If the number of active network flows decreases to 10 at time t2, then 10 credits are assigned to each active network flow after time t2.

In some embodiments, to prevent oversubscription of the adaptive policer 18 some sampling capacity of the adaptive policer 18 may be reserved and the remaining sampling capacity of the adaptive policer 18 is divided among the network flow 24. Therefore, the adaptive policer 18 is configured to compute the respective quantity of flow-specific sampling credits to be assigned to each of the respective network flows 24 responsively to a reserved sampling capacity of the adaptive policer 18, which avoids oversubscribing of the adaptive policer 18.

For example, if the adaptive policer 18 can sample 100 packets in a given time period, then 90 credits may be allocated among the network flows while 10 credits are reserved.

In some embodiments, the adaptive policer 18 is configured to compute (block 214) the reserved sampling capacity of the adaptive policer 18 responsively to the quantity of the respective network flows 24 currently being processed by the packet processing circuitry 14. In some embodiments, the reserved capacity may be inversely proportional to the number of active network flows 24. For example, if there are 2 network flows 24, the reserved capacity may correspond to 30 credits and if there are 10 network flows 24, the reserved capacity may correspond to 5 credits.

The reserved capacity and/or the number of credits assigned to each active network flow 24 may be computed based on any suitable algorithm, for example, a dynamic threshold scheme. For example, the reserved capacity and/or the number of credits assigned to each active network flow 24 may be computed based on an algorithm, which is used to reserve buffer space according to the number of output queues as described in Hahne (Ellen Hahne. IEEE/ACM Transactions on Networking, Vol 10, No. 3, June 2002), as described in more detail with reference to FIGS. 3-5. The algorithm of Hahne may be applied to compute the reserved sampling capacity but instead of computing the reserved capacity based on the number of output queues as described in Hahne, the reserved capacity is computed based on the number of active network flows.

Figure 3:
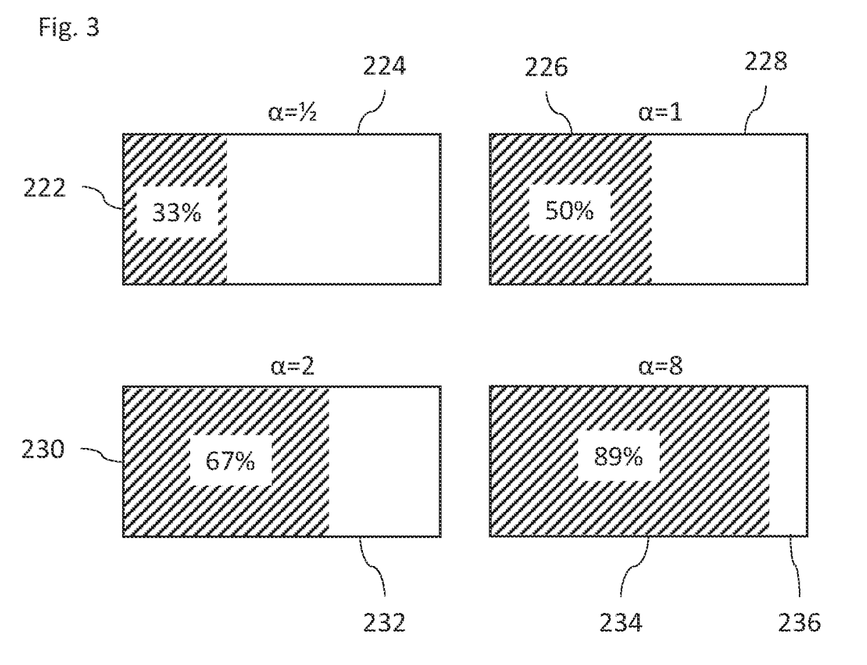
FIG. 3 is view illustrating avoiding oversubscribing for various values of alpha for use in the method of FIG. 2.

Reference is now made to FIG. 3, which is view illustrating avoiding oversubscribing for various values of alpha for use in the method of FIG. 2. The reserved capacity may be defined with respect to a given value alpha ($\alpha$) and the number of active network flows 24. FIG. 3 illustrates how the reserved capacity changes with different values of alpha and one active network flow 24. FIG. 3 shows that with alpha equal to a half, the network flow 24 is assigned 33% of the total sampling credits (block 222), leaving 67% of the total sampling credits as reserved (block 224). The term "total sampling credits" is defined as the total number of samples that the adaptive polices 18 can perform in the time period over which the flow-specific sampling credits are assigned. With alpha equal to one, the network flow 24 is assigned 50% of the total sampling credits (block 226), leaving 50% of the total sampling credits as reserved (block 228). With alpha equal to two, the network flow 24 is assigned 67% of the total sampling credits (block 230), leaving 33% of the total sampling credits as reserved (block 232), With alpha equal to eight, the network flow 24 is assigned 89% of the total sampling credits (block 234), leaving 11% of the total sampling credits as reserved (block 236).

Figure 4:
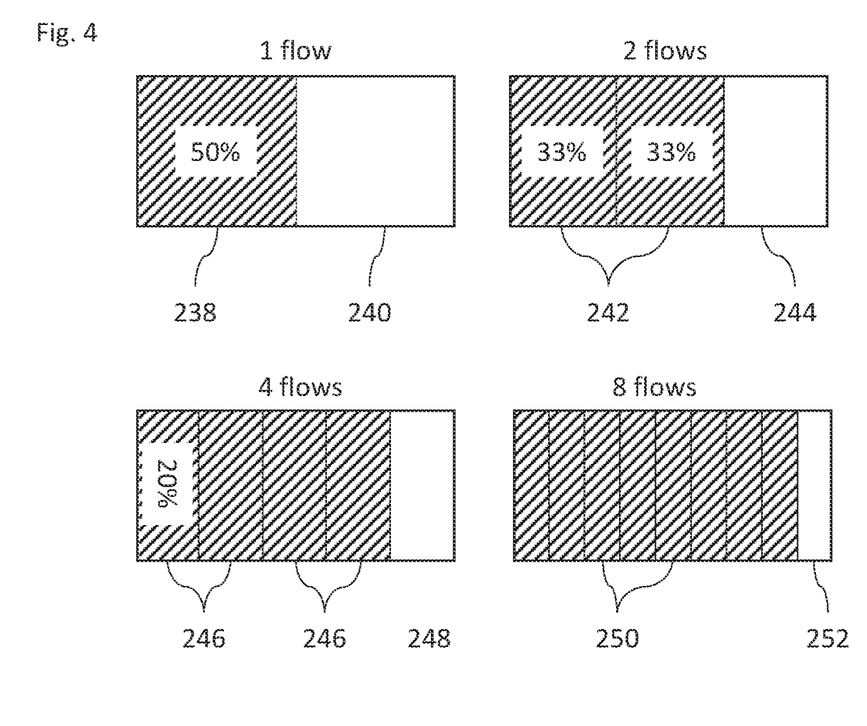
FIG. 4 is a view illustrating avoiding oversubscribing for various flow quantities for use in the method of FIG. 2.

Reference is now made to FIG. 4, which is a view illustrating avoiding oversubscribing for various numbers of network flows for use in the method of FIG. 2. FIG. 4 illustrates how the reserved capacity changes with a value of alpha equal to one and different numbers of active network flows 24. FIG. 4 shows that when there is one active network flow 24, the network flow 24 is assigned 50% of the total sampling credits (block 238), while 50% of the total sampling credits are reserved (block 240), When there are two active network flows 24, each network flow 24 is assigned 33% of the total sampling credits (blocks 242), while the remainder of the total sampling credits is reserved (block 244). When there are four active network flows 24, each network flow 24 is assigned 20% of the total sampling credits (blocks 246), while the remainder (20%) of the total sampling credits is reserved (block 248). When there are eight active network flows 24, each network flow 24 is assigned 11% of the total sampling credits (blocks 250—only some labeled for the sake of simplicity), while the remainder of the total sampling credits is reserved (block 252).

In some embodiments, the fraction of the total sampling credits that can be assigned to each active network flow 24 is equal to:

$$\frac{\alpha}{1 + f \cdot \alpha}$$

Where α is the selected alpha value and f is the number of active flows.

Figure 5:
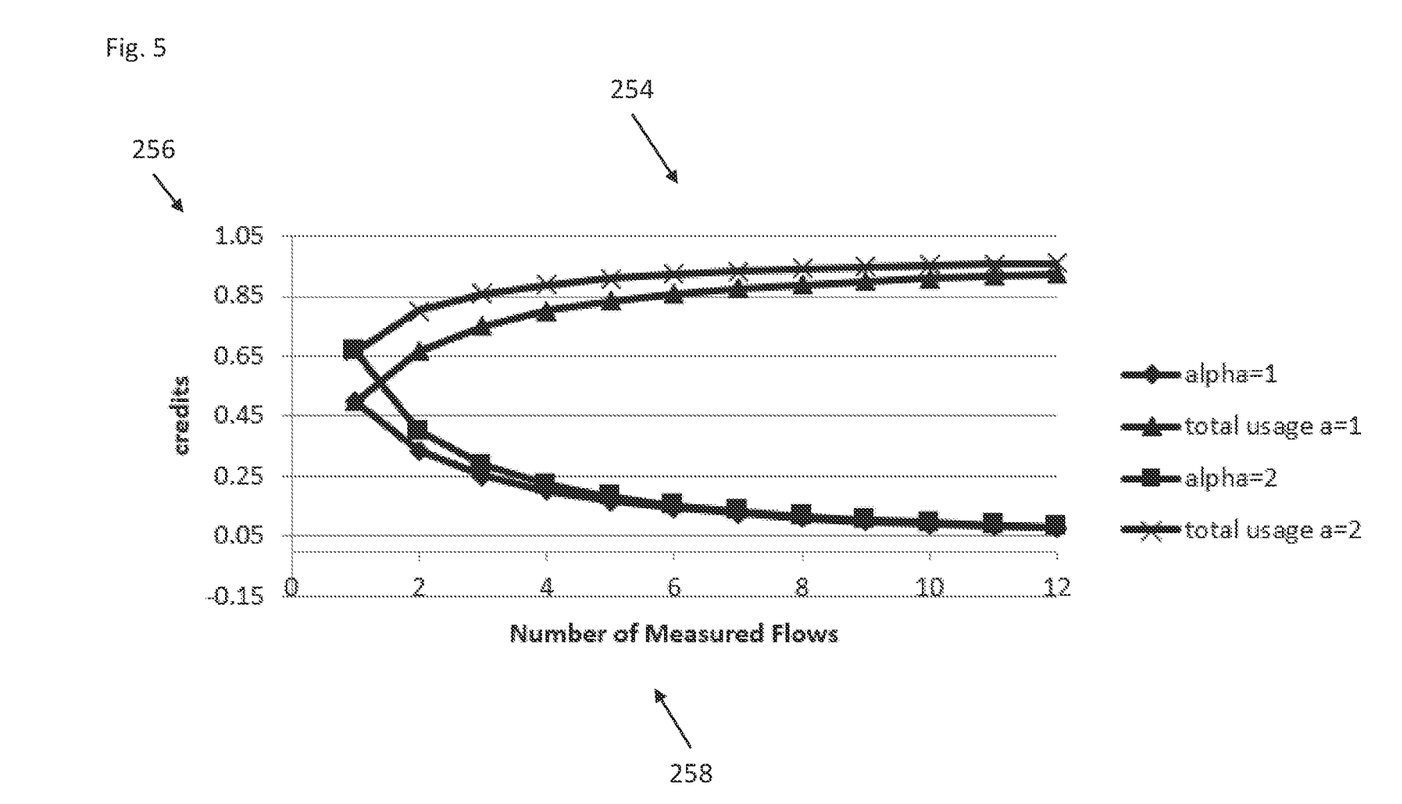
FIG. 5 is a graph illustrating assignment and usage of credits for example values of alpha for use in the method of FIG. 2.

Reference is now made to FIG. 5, which is a graph 254 illustrating assignment and usage of credits (axis 256) for example values of alpha for use in the method of FIG. 2. The graph 254 shows the fraction of the total available credits assigned to each network flow 24 according to the number of measured flows (axis 258) for alpha equal to 1 and 2. The graph also shows the total fraction of credit usage versus the number of measured flows (axis 258) for alpha equal to 1 and 2.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A network flow sampling system comprising:
   packet processing circuitry to process data packets of multiple network flows; and
   an adaptive policer to, for each one network flow of the multiple network flows:
      compute a quantity of flow-specific sampling credits to be assigned to the one network flow responsively to a quantity of the network flows currently being processed by the packet processing circuitry;
      assign the flow-specific sampling credits to the one network flow;
      sample at least one of the data packets of the one network flow responsively to availability of the flow-specific sampling credits of the one network flow yielding sampled data, while applying sampling fairness among the network flows; and
      remove at least one of the flow-specific sampling credits of the one network flow from availability responsively to sampling the at least one data packet of the one network flow.

2. The system according to claim 1, wherein the adaptive policer is configured to sample ones of the data packets of each of the network flows being processed by the packet processing circuitry while applying sampling fairness among the network flows.

3. The system according to claim 1, wherein the adaptive policer is configured to assign additional flow-specific sampling credits to each of the network flows intermittently.

4. The system according to claim 3, wherein the adaptive policer is configured to assign additional flow-specific sampling credits to each of the network flows responsively to a minimum flow-specific sampling credit threshold.

5. The system according to claim 3, wherein the adaptive policer is configured to compute a quantity of the additional flow-specific sampling credits to be assigned to each of the network flows responsively to a quantity of the network flows currently being processed by the packet processing circuitry.

6. The system according to claim 5, wherein the adaptive policer is configured to compute the quantity of the additional flow-specific sampling credits to be assigned to each of the network flows responsively to a function which has an output which is inversely proportional to the quantity of the network flows currently being processed by the packet processing circuitry.

7. The system according to claim 6, wherein the adaptive policer is configured to compute the quantity of the additional flow-specific sampling credits to be assigned to each of the network flows responsively to a reserved sampling capacity, which avoids oversubscribing of the adaptive policer.

8. The system according to claim 7, wherein the adaptive policer is configured to compute the reserved sampling capacity of the adaptive policer responsively to the quantity of the network flows currently being processed by the packet processing circuitry.

9. The system according to claim 1, wherein the adaptive policer is configured to forward the sampled data to a data analyzer.

10. The system according to claim 9, further comprising the data analyzer, which is configured to perform any one or more of the following responsively to the sampled data:
provide information about network performance;
identify network bottlenecks;
identify lost packets;
identify lost flows;
perform general debugging;
perform end-to-end debugging; or
provide information for the purposes of network optimization and future planning.

11. A network flow sampling method, comprising:
processing data packets of multiple network flows;
for each one network flow of the multiple network flows:
computing a quantity of flow-specific sampling credits to be assigned to the one network flow responsively to a quantity of the network flows currently being processed by packet processing circuitry;
assigning the flow-specific sampling credits to the one network flow;
sampling at least one of the data packets of the one network flow responsively to availability of the flow-specific sampling credits of the one network flow yielding sampled data, while applying sampling fairness among the network flows; and
removing at least one of the flow-specific sampling credits of the one network flow from availability responsively to sampling the at least data packet of the one network flow.

12. The method according to claim 11, further comprising assigning additional flow-specific sampling credits to each of the network flows intermittently.

13. The method according to claim 12, wherein the assigning the additional flow-specific sampling credits to each of the network flows is performed responsively to a minimum flow-specific sampling credit threshold.

14. The method according to claim 12, further comprising computing a quantity of the additional flow-specific sampling credits to be assigned to each of the network flows responsively to a quantity of the network flows currently being processed by the packet processing circuitry.

15. The method according to claim 14, wherein the computing the quantity of the additional flow-specific sampling credits includes computing the quantity of the additional flow-specific sampling credits to be assigned to each of the network flows responsively to a function which has an output which is inversely proportional to the quantity of the network flows currently being processed by the packet processing circuitry.

16. The method according to claim 15, wherein the computing the quantity of the additional flow-specific sampling credits includes computing the quantity of the additional flow-specific sampling credits to be assigned to each of the network flows responsively to a reserved sampling capacity, which avoids oversubscribing.

17. The method according to claim 16, wherein the computing the quantity of the additional flow-specific sampling credits includes computing the reserved sampling capacity responsively to the quantity of the network flows currently being processed by the packet processing circuitry.

18. The method according to claim 11, further comprising forwarding the sampled data to a data analyzer.

19. The method according to claim 18, further comprising performing any one or more of the following responsively to the sampled data:
providing information about network performance;
identifying network bottlenecks;
identifying lost packets;
identifying lost flows;
performing general debugging;
performing end-to-end debugging; or
providing information for the purposes of network optimization and future planning.

20. A software product, comprising a non-transient computer-readable medium in which program instructions are stored, which instructions, when read by a central processing unit (CPU), cause the CPU to, for each one network flow of the multiple network flows:
compute a quantity of flow-specific sampling credits to be assigned to each one network flow responsively to a quantity of the network flows currently being processed by packet processing circuitry;
assign the flow-specific sampling credits to the one network flow;
sample at least one of the data packets of the one network flow responsively to availability of the flow-specific sampling credits of the one network flow yielding sampled data, while applying sampling fairness among the network flows; and
remove at least one of the flow-specific sampling credits of the one network flow from availability responsively to sampling the at least one data packet of the one network flow.

* * * * *